March 23, 1965 K. O. SISSON 3,174,596
SELF-RELEASING BRAKING SYSTEM FOR A DOMESTIC APPLIANCE
Filed July 31, 1961 3 Sheets-Sheet 1

INVENTOR.
Kenneth O. Sisson
BY
Frederick M. Ritchie
His Attorney

March 23, 1965     K. O. SISSON     3,174,596
SELF-RELEASING BRAKING SYSTEM FOR A DOMESTIC APPLIANCE
Filed July 31, 1961                                  3 Sheets-Sheet 2
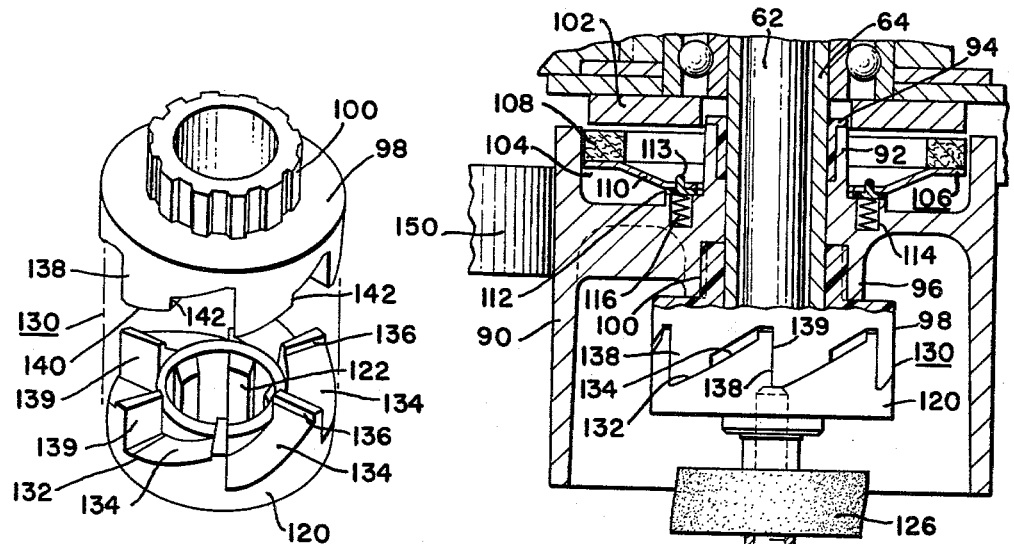
Fig. 5
Fig. 3
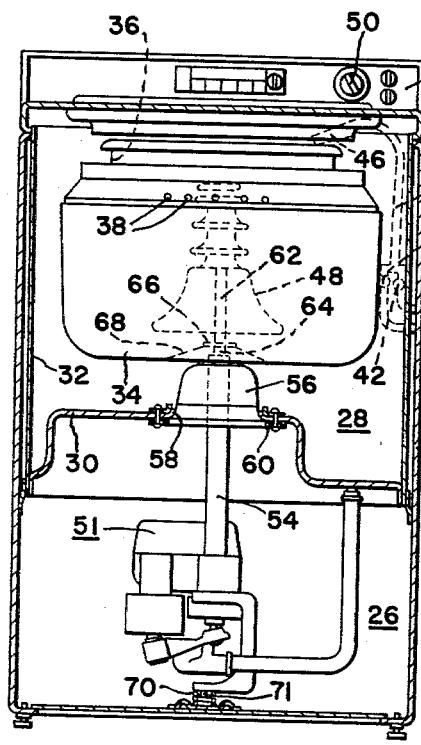
Fig. 2
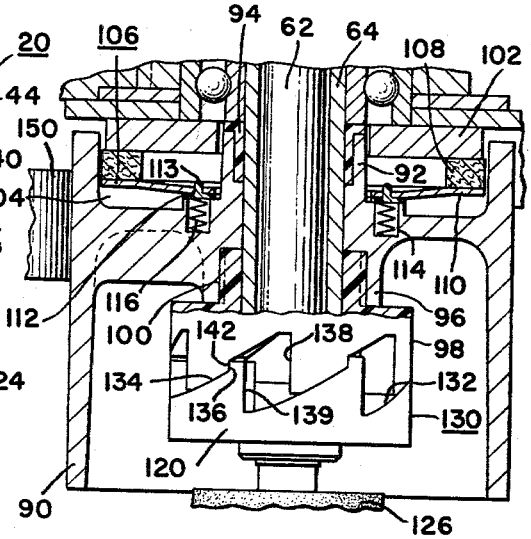
Fig. 4
INVENTOR.
Kenneth O. Sisson
BY
Frederick M. Ritchie
His Attorney INVENTOR.
Kenneth O. Sisson
BY
Frederick M. Ritchie
His Attorney //  ## United States Patent Office 3,174,596
Patented Mar. 23, 1965

3,174,596
SELF-RELEASING BRAKING SYSTEM FOR A DOMESTIC APPLIANCE
Kenneth O. Sisson, Dayton, Ohio, assignor to General Motors Corporation, Detroit, Mich., a corporation of Delaware
Filed July 31, 1961, Ser. No. 128,074
13 Claims. (Cl. 192—8)

This invention relates to a domestic appliance and more particularly to an improved braking system for a roller drive mechanism in a clothes washer.

In an agitator and spin mechanism such as taught in the copending application Serial No. 5,174, filed January 28, 1960, and assigned to the same assignee as this invention, now Patent No. 3,087,321, issued April 30, 1963, it is desirable that means be provided for quickly braking or decelerating the spin tub at the conclusion of a centrifuging or spinning operation. Thus, in the copending application a braking system was taught in which a spin drum was threadedly engaged with the lower end of the spin shaft and was operable between an upper and lower position for alternately braking or driving the spin shaft. A problem occasionally arises with this prior art arrangement in that the threaded connection between the relatively moving parts tends to jam at the extremes of its raised and lowered positions. Such a jamming condition may result in stripping the threads from either the spin drum or the spin shaft or in knocking the stop collar from the bottom of the spin shaft.

Accordingly, it is an object of this invention to provide an improved braking system for a roller drive agitate and spin mechanism.

A further object of this invention is the provision of a brake actuating cam between a spin drum and the spin shaft which is self-releasing in either its drive or brake position.

It is also an object of this invention to provide a braking system for a roller drive mechanism which includes a teaser spring for insuring prompt application of the braking force at the conclusion of spin.

More particularly, it is an object of this invention to provide a spin tub braking system for an agitate and spin mechanism which includes a teaser spring for aiding the tub inertia in initiating a braking force at the conclusion of spin.

Further objects and advantages of the present invention will be apparent from the following description, reference being had to the accompanying drawings wherein preferred embodiments of the present invention are clearly shown.

In the drawings:

FIGURE 2 is a schematic sectional view, partly in elevation, of a clothes washer provided with the improved roller drive agitate and spin mechanism;

FIGURE 3 is an enlarged sectional view, partly in elevation, of the brake actuating cam in its spin drive relationship;

FIGURE 4 is an enlarged sectional view, partly in elevation, of the brake actuating cam in its braking relationship;

FIGURE 5 is an exploded perspective of the brake actuating cam; and

Figure 1:
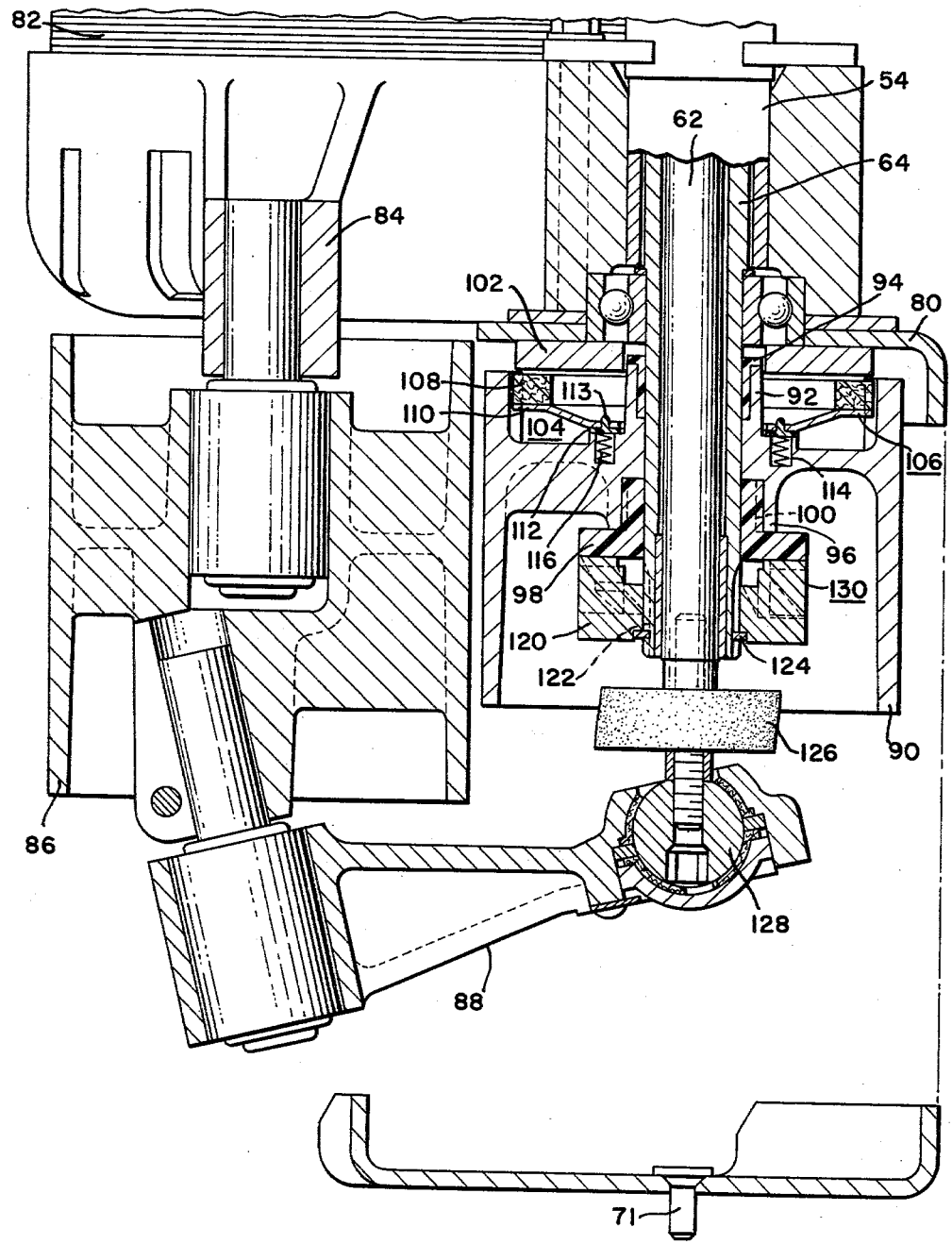
FIGURE 1 is a sectional view of an improved roller drive agitate and spin mechanism, partly in elevation, to show the brake actuating cam of this invention.

In accordance with this invention and with reference to FIGURE 2, a clothes washer 20 is comprised of a control housing assembly 22 and a casing 24. The casing 24 is generally divided into a mechanism portion or compartment 26 and a washing compartment or water container chamber 28. A generally centrally located bulkhead 30 separates the mechanism compartment 26 from the water container chamber 28 which is further bounded by a cylindrical water container wall 32. Within the water container 32 is a spin tub 34 having a top opening 36 in a plurality of centrifuging outflow ports 38. The ports 38 are designed to permit the egress of water from the tub 34 when the tub is rotated at high speed. For filling the tub 34 with water a conventional water supply system may be provided with a hot water solenoid actuated valve 40 and a cold water solenoid operated valve 42 which are manifolded into a mixed water supply conduit 44 terminating at a chute 46 overlying the opening 36 of the tub 34. Within the tub 34, an agitator or pulsator 48 is adapted to reciprocate to circulate or agitate the water admitted through the water supply conduit 44. Thus, clothing placed within the tub 34 is washed as the agitating action of the pulsator 48 causes surging toroidal currents of washing fluid and detergent through the fabric. Conventional sequential operating timer means, shown generally at 50 on the control housing 22, may be included selectively to admit water through the supply conduit 44, to spin the tub 34 and to vertically reciprocate the agitator or pulsator 48.

The prior art mechanisms for selectively spinning tub 34 and reciprocating an agitator 48 are taught in the aforementioned copending application Serial No. 5,174 and a copending application Serial No. 128,233, now Patent No. 3,060,712, filed concurrently herewith. This invention is directed to an improved braking system for use with the mechanisms taught in either of the aforementioned copending applications and is shown generally in FIGURE 2 as 51. The mechanism 51 is suspended from a stationary shaft enclosing housing portion 54 which is connected to a resilient cup-shaped support member 56. The support member 56, in turn, is affixed to an opening 58 in the bulkhead 30—sealing gasket 60 being provided to effect a watertight connection therebetween. Extending upwardly from the stationary enclosing housing 54 is an agitate or pulsate shaft 62 to which the agitator 48 is connected and a spin shaft 64 which is connected as by a tub support nut 66 to the bottom wall 68 of the spin tub 34. In order to dampen excessive gyrating or swinging movement of the agitate and spin mechanism's lower end, a snubber device, shown generally at 70, is included to receive the snubbing stud 71. For additional details pertaining to the general operation of the roller drive type mechanism, reference may be had to the aforementioned copending application, Serial No. 5,174.

The braking system of this invention will now be described more fully with reference to FIGURE 1. Note that the shaft enclosing housing 54 is connected to a support member 80 which serves to carry a reversible drive motor or prime mover 82 and studs or bosses such as 84 for rotatably carrying an agitate drum 86 and a pulsator arm assembly 88 which cooperate to reciprocate vertically the agitate shaft 62 as taught in the aforesaid copending applications.

The spin shaft 64 extends downwardly out of the shaft enclosing housing 54 for receiving the components relating to spinning and braking. More particularly, a spin drum or rotating means 90 is formed with an upper collar 92 for receiving a plastic bushing or spin shaft bearing 94 and a lower collar 96 for receiving a spin drum bushing 98 of a suitable durable plastic such as Delrin or equivalent—the bushing 98 being keyed to the inner depending collar 96 of the spin drum 90 by a splined connection such as indicated at 100, thereby to comprise a spin shaft driving means. Circumscribing the spin shaft 64 and affixed to the support 80 is a brake disc 102 fixed relative to the shaft housing 54.

The top of the spin drum 90 is formed with a cavity or hollow space 104 for receiving a brake assembly, shown generally at 106. So that the brake assembly will not rotate relative to the spin drum, the inside peripheral wall of the cavity is formed with splines or with an octagonal configuration. Thus the braking assembly is comprised of a brake engagement portion, brake plate or washer of frictional material 108 configured to complement the splines or octagonal shape of the cavity, a Belleville-type brake releasing spring or finger washer 110 to bias the friction washer and a plastic guide washer 112 with lugs 113 for centering the spring washer 110 around the drum collar 92 to prevent noisy operation. Note also that several pockets 114 have been formed in the bottom of the cavity to receive several light teaser springs or brake actuating means 116, the purpose of which will be explained more fully hereinafter.

The stack up of the spin drive and brake assembly is as follows. The spin shaft bearing 94 is interfitted with the top collar 92 of the spin drum as is the lower spin drum bushing 98 with the lower collar 96. The brake assembly 106 is seated within the drum cavity 104 just covering the teaser springs 116. Then the assembly is slipped over the lower end of the cylindrical spin shaft 64 and a spin roll stop 120 slipped over the exposed depending end of the spin shaft, a spline 122 preventing relative rotation of the spin roll stop relative to the spin shaft 64. A C-clamp 124 in an annular groove in the spin shaft retains the entire stack up on the spin shaft. Note that only the spin roll stop 120 is keyed for positive rotation with the spin shaft these components comprising a rotatable driven means.

Next, the flexible connector 126 can be threadedly engaged with the tapped end of the agitate shaft 62 and the entire assembly connected to the spherical bearing 128 of the pulsator arm assembly 88 as taught more fully in my copending application Serial No. 128,233.

The brake actuating cam assembly 130 is best seen in the perspective of FIGURE 5 wherein the spin drum bushing 98 and the spin roll stop 120 are shown exploded from their assembled relationship. Note that recesses 132 are formed facing upwardly on the spin roll stop 120. The bottom portions 134 of these recesses comprise a plurality of spiral surfaces inclining about the splined central collar of the spin roll stop. At the upper end of each spiral surface 134 is a raised stop or abutment portion 136. Cooperating therewith, the spin drum bushing 98 has a plurality of depending teeth 138 with downwardly facing spiral surface configurations 140 complementary to those upwardly facing surfaces 134 in the recesses below. Note also that upper stop or abutment portions 142 are formed on the depending teeth for mating with the lower stop abutments 136 on the spin roll stop element 120.

With reference now to FIGURES 3 and 4, the operation of this improved braking system will be set forth. A fragment of an idler drive roller or driving means 150 is shown schematically in FIGURES 3 and 4 as an aid in understanding the operation of this invention. It should be understood that the roller 150 will be in an idling relationship between the drive pinion or shaft of the motor 82 and the spin drum 90. FIGURE 3 exemplifies the condition when the spin tub 34 is being spun at high speed. The drive is from the idler drive roller 150 to the outer periphery of the spin drum 90. Since the spin drum is keyed at 100 to the spin drum bushing, the driving force will be transmitted therethrough by the depending teeth 138 which abut the deep end 139 of the driving recesses 132 on the roll spin stop. Since the spin roll stop 132 is connected through a spline 122 to the spin shaft 64 (see FIGURES 1 and 5), the spin shaft and thus the spin tub will be rotated.

At the conclusion of spin, the motor 82 is deenergized and the idler drive roller 150 will no longer exert a driving torque on the spin drum 90, i.e., drive release. Since the inertia of the spin tub 34 and its shaft 64 is considerably greater than that of the spin drum 90 and its prime mover components, the spin drum 90 will tend to decelerate more quickly. As the rates of deceleration diverge between the spin tub and spin drum, the spin drum bushing will start to rotate relatively to the spin roll stop, the teeth 138 starting to climb the spiral cam surface 134 on the spin roll stop. Thus, the cam surface 134 acts to apply the brake uniformly by raising the spin drum 90 to compress the Belleville spring 110 and the affixed friction plate 108 against the brake disc 102. The braking situation is shown in FIGURE 4 at its extreme wherein the stops 142 on the bushing and 136 on the spin roll stop engage to cause the brake plate and brake disc to rotate relatively. The high inertia spinning system including the tub and spin shaft is thus quickly braked to a halt. As soon as the tub stops spinning, the compressed Belleville spring 110 will relax to its FIGURE 3 configuration forcing the spin drum 90 rotatably downwardly by causing the depending teeth 138 to slide down the spiral surfaces 134 on the spin roll stop. Thus, the spin tub system is backed off about one-eighth of a turn to relieve the spring. This releases the brake so that the next spin start up has no drag. Further, this prevents any lock up or jamming of the spin drum in its raised or braking position.

The design of the mating spiral cam surfaces 134 and 140 on the brake assembly 130 should be such as to provide free movement therebetween. Satisfactory relative movement has been found when the inclination of the surface 134 and 140 is not less than fifteen degrees nor more than twenty-five degrees. It is only necessary that the surfaces be steep enough to cause the tub to back off upon the urging of the relaxing Belleville spring, but not so steep that the stops 136 and 142 do not engage, i.e., no maximum braking effort would result.

A modification of the foregoing braking system may include a teaser or brake actuating spring 116. Three or four of the light springs 116 have been used with this invention with satisfactory results. The use of such teaser springs is to overcome those situations wherein the drive roller 150 has practically no frictional drag on the spin drum 90. In such situation, the friction of the motor and the prime mover system is not imparted to the spin drum 90 and the possibility arises that the spin drum 90, for all intents and purposes, would rotate at the same speed as the spin shaft 64 for an unduly long period during which time the braking system would not be applied. In other words, unless prompt and significant relative rotation occurs between spin shaft and spin drum as soon as the motor 82 is deenergized to terminate spin, i.e., drive release, the braking action is delayed. By using several of the teaser springs 116 a light drag is imparted between the friction material plate 108 and the brake disc 102. The pressure or drag is such as to impart an insignificant drag on the motor 82, but just sufficient to institute relative rotation between the spin drum and the spin shaft as soon as the motor 82 is deenergized, i.e., drive released. Thus, the teaser springs 116 insure the prompt application of the brake. Note that clearance has been shown between the friction plate and brake disc in the drive positions of FIGURES 1 and 3 to clarify the operation of the brake. However, the use of teaser springs will actually cause a light touching between plate and disc even during drive.

Figure 6:
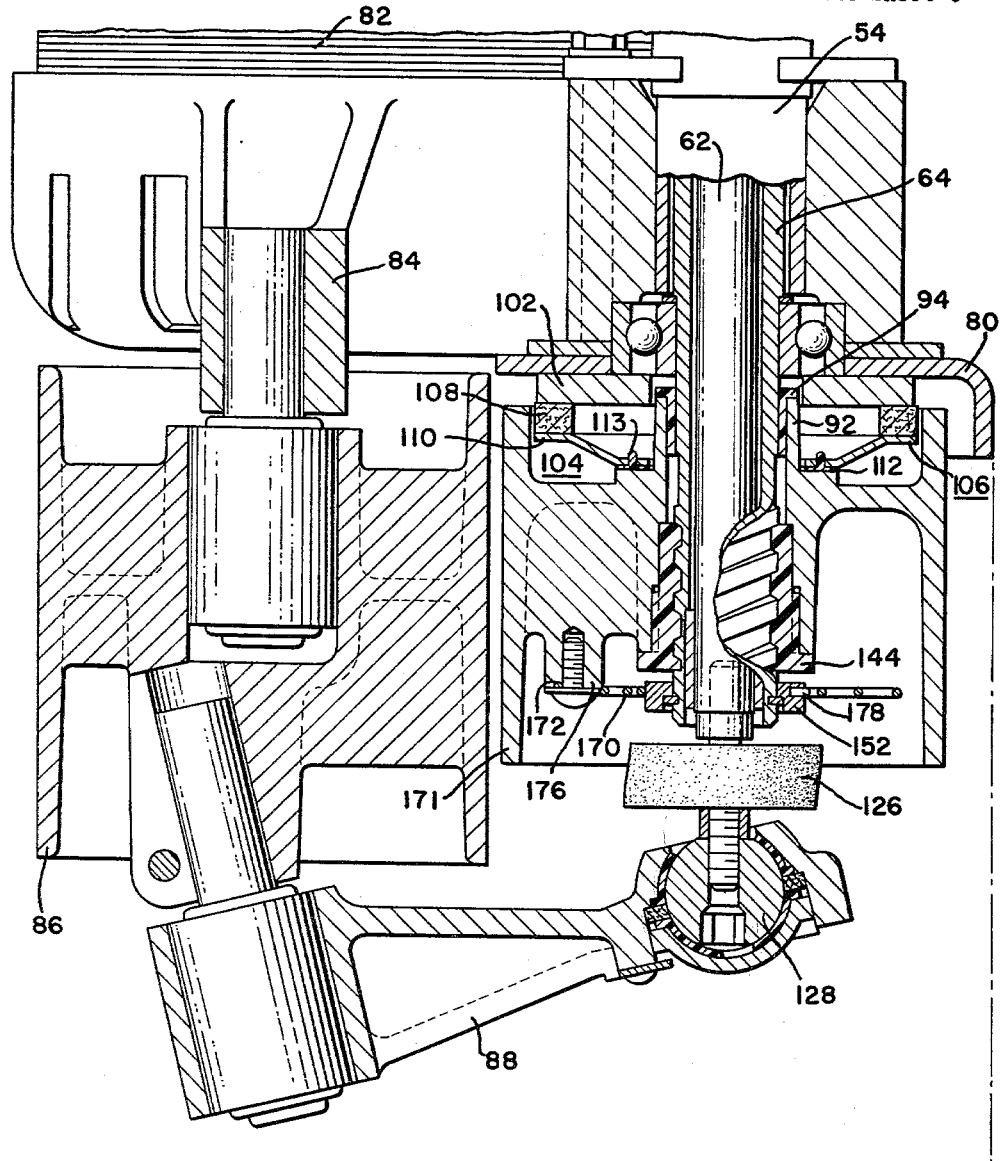
FIGURE 6 is another embodiment of the improved braking system.

Another embodiment of the teaser spring concept is shown in FIGURE 6 which illustrates the braking system disclosed in the aforementioned copending applications.

A spiral teaser or brake actuating spring 170 is positioned about the spin shaft 64 with one end 172 retained by a bolt in a boss 176 of the spin drum 171 and the other end 178 fixed in the stop member 152 which is keyed to the spin shaft 64.

The spiral teaser spring is set with a strength approximately equal to the driving torque during spin, i.e., a countertorque upon drive release. Thus, the spin drum hub or bushing 144 rests lightly on the stop member 152 at the bottom of the spin shaft. Then, as soon as the motor is deenergized at the end of the spin, the driving torque is eliminated and the spring is free to unwind. As the spring unwinds, the spin drum 171 moves relative to the spin shaft and starts to screw itself upwardly to place the brake plate 108 into rubbing engagement with the fixed brake disc (FIGURE 6). As soon as the plate and disc engage, the relative rotation of spin drum and spin shaft is more pronounced to apply the brake hard and stop the tub 34 from spinning.

It should now be seen that a trouble free prompt acting brake has been taught for a roller drive mechanism.

While the embodiments of the present invention as herein disclosed constitute preferred forms, it is to be understood that other forms might be adopted.

What is claimed is as follows:

1. A self-actuating, self-releasing braking system for a spinning mechanism comprising, a stationary member, a rotatable member, rotating means movably operatively connected to said rotatable member for drivably rotating said rotatable member and cammingly cooperating with said rotatable member for relative axial movement therebetween, said rotating means axially movable between drive and brake positions relative to said rotatable member and said stationary member depending respectively on whether said rotatable member is being driven by said rotating means or released from the drive of said rotating means, and braking means operatively interconnected with said rotating means for rotation therewith and having a brake engagement portion for cooperating with said stationary member to stop said rotatable member upon drive release in response to the movement of said rotating means to said brake position, said braking means including brake actuating and releasing means between said rotatable means and said brake engagement portion and biasingly operatively connected to said rotating means and said brake engagement portion, said brake actuating and releasing means having one portion for first urging said brake engagement portion toward said stationary member when said rotating means is drivably rotating said rotatable member to insure prompt camming cooperation between said rotating means and said rotatable member for movement of said rotating means to said brake position to stop said rotatable member as soon as said rotating means stops drivably rotating said rotatable member, said brake actuating and releasing means having another portion then responsive to the stopping of said rotatable member to move said rotating means from said brake position to said drive position.

2. The braking system of claim 1 wherein said brake actuating and releasing means includes a spiral spring having one end connected to said rotating means and another end connected to said rotatable member in a manner to effect a rotatable drive opposite to the rotatable drive of said rotating means when said rotating means is drivably rotating said rotatable member.

3. The braking system of claim 1 wherein said brake actuating and releasing means includes a coil spring carried by said rotating means between said rotating means and said brake engagement portion to shift said brake engagement portion into lightly dragging engagement with said stationary member.

4. In combination, two shaft means concentrically arranged, a stationary support housing enclosing the shaft means, the opposite adjacent ends of each of said shaft means protruding out of said stationary support housing, means preventing relative rotation of said two shaft means, a spin drum threadedly engaging one of said shaft means and having a driving position and a braking position, a brake plate keyed against relative rotation to said spin drum, a brake disc connected to said stationary support housing and adjacent said brake plate, means for applying torque to said spin drum for driving said spin drum to said driving position for rotating said one of said shaft means, brake actuating means between said brake plate and said spin drum and biasing said brake plate into slightly touching engagement with said brake disc while said spin drum is rotating said one of said shaft means and responsive to drive release by said means for applying torque to initiate promptly the movement of said spin drum to said braking position.

5. In combination, a spin shaft means and an agitate shaft means concentrically arranged, an enclosing housing substantially enclosing the shaft means, the opposite adjacent ends of each of said shaft means protruding out of said housing, said spin shaft means having a threaded portion on said protruding end, means preventing relative rotation of said spin shaft means and said agitate shaft means, a spin drum threadedly engaging said threaded portion and having a driving position at one end of said threaded portion and a braking position at the other end of said threaded portion, a brake plate keyed against relative rotation to said spin drum and movable axially relative to said spin drum, a first spring member interposed between said brake plate and said spin drum, a brake disc affixed to said enclosing housing adjacent said brake plate, and means for driving said spin drum to said driving position for rotating said spin shaft means, a second spring member having one end connected to said spin drum and its other end connected to said spin shaft means, said spin drum promptly moving to said braking position in response to drive release by said means for driving due to the urging of said second spring member and the difference in inertia between said spin shaft and said spin drum thereby to stop said spin shaft means, said spin drum after said spin shaft means has stopped then promptly moving to said driving position due to the urging of said first spring member.

6. In combination, a spin tub, rotatable spin shaft means affixed at one end thereof to said tub, a stationary support housing enclosing the spin shaft means, the opposite end of said spin shaft means protruding out of said stationary support housing, a spin drum bushing relatively rotatably and axially shiftably carried on said shaft means and having a downardly facing inclined surface portion, a spin drum affixed to said bushing and movable therewith between a spin shaft means driving position and a spin shaft means braking position, a spin stop member affixed to said spin shaft means and having an upwardly facing surface portion complementary to said downwardly facing surface portion, each of said surface portions having drive abutments at one end thereof and spin stop abutments at the other end thereof, said spin shaft means and said spin stop member having greater spinning inertia than said spin drum and said spin drum bushing, a brake plate keyed against relative rotation to said spin drum but restrictably axially shiftable relative thereto, brake releasing means between said brake plate and said spin drum for biasing said spin drum from said braking position to said driving position, a brake disc connected to said stationary support housing and adjacent said brake plate, and means for selectively applying torque to said spin drum for rotating said spin shaft means, whereby said drive abutments are engaged to interlock drivingly said spin stop member and said spin drum bushing when said torque is being applied for spinning said spin shaft means and whereby said spin stop abutments are engaged to cam said brake plate into frictional slipping engagement with said brake disc to stop the spinning of said spin shaft means when said torque is not being applied, said brake releasing means biasing said spin drum from said braking position to said driving position when said torque is not being applied and said spin shaft means is not spinning.

7. In combination, a spin shaft means, a housing for said spin shaft means, the end of said spin shaft means protruding out of said housing, a spin drum bushing relatively rotatably and axially shiftably carried on said protruding end of said spin shaft means and having a downwardly facing inclined surface portion, a rotatable spin drum affixed to said bushing and movable therewith between a spin shaft means driving position and a spin shaft means braking position, a spin stop member affixed to said protruding end of said spin shaft means and having an upwardly facing surface portion complementary to said downwardly facing surface portion, each of said surface portions having drive abutments at one end thereof and spin stop abutments at the other end thereof, said spin shaft means and said spin stop member having greater spinning inertia than said spin drum and said spin drum bushing, a brake plate keyed against relative rotation to said spin drum but restrictably axially shiftable relative thereto, a brake disc connected to said housing and adjacent said brake plate, whereby said drive abutments are engaged to interlock drivingly said spin stop member and said spin drum bushing when said spin drum is rotated in one direction and whereby said spin stop abutments are engaged by relatively rotating said surface portions to cam said brake plate into frictional slipping engagement with said brake disc to stop the spinning of said spin shaft means when said spin drum is not rotated, and brake releasing spring means between said brake plate and said spin drum for biasing said spin drum from said braking position to said driving position when said spin drum is not rotated and said spin shaft means is not spinning.

8. A self-releasing braking system for a spinning mechanism comprising, a stationary member, a rotatable driven means operatively connected to said rotatable driven means, driving means for rotating said rotatable driven means, said driving means having first and second positions relative to said rotatable driven means, and a brake rotatable with said driving means and having a brake engagement portion for cooperating with said stationary member to stop or release said rotatable driven means in response to the movement of said driving means between said positions, a first cam on one of said means, a second cam on the other of said means, said cams moving together into driving relationship when said driving means is in said first position and said cams moving apart to force said driving means to said second position and said brake engagement portion into frictionally sliding engagement with said stationary member to stop the rotation of said driven means when said driving means is not rotating said driven means, and brake releasing spring means between said brake engagement portion and said driving means for biasing said driving means from said second position to said first position substantially to release the engagement of said brake engagement portion and said stationary member as soon as said driving means is not rotating said driven means and said driven means is not rotating.

9. In combination, two shaft means concentrically arranged, an enclosing housing enclosing the shaft means, the opposite adjacent ends of each of said shaft means protruding out of said housing, means preventing relative rotation of said two shaft means, a spin drum operatively connected to one of said shaft means and having a driving position and a braking position, a brake plate keyed against relative rotation to said spin drum, a brake disc connected to said enclosing housing adjacent said brake plate in a manner to be stationary relative to said enclosing housing, driving means operatively connected to said spin drum for applying torque to said spin drum for driving said spin drum to said driving position for rotating said one of said shaft means, and brake actuating means interposed between said spin drum and said brake plate and responsive to drive release of said driving means to initiate the movement of said spin drum to said braking position at the termination of said driving to stop said one of said shaft means, said brake actuating means including means interposed between said spin drum and said brake plate for urging said brake plate toward said brake disc.

10. A self-actuating, self-releasing braking system for a spinning mechanism comprising, a stationary shaft housing, a rotatable spin shaft in said housing and having a threaded portion extending outside of said housing, a spin shaft driving means threadedly connected to said threaded portion and axially movable relative to said spin shaft between a driving position and a braking position, prime mover means operatively connectable to said spin shaft driving means for selectively rotatably moving said driving means into said driving position for rotating said spin shaft, first spring means between said spin shaft and said driving means and acting oppositely to the torque of said prime mover means for urging said driving means into said braking position as soon as the rotation of said driving means by said prime mover means is terminated, said first spring means being insufficient to overcome the torque of said prime mover means when said prime mover means is operatively connected to said driving means, spin shaft rotation responsive brake means connected to said driving means for movement therewith and between said driving means and said housing for resisting rotation of said spin shaft means when said driving means is in said braking position, and second spring means between said brake means and said driving means for urging said driving means from said braking position into said driving position as soon as said spin shaft means stops rotating.

11. The braking system of claim 8 wherein said spring means includes a first spring interposed between said brake engagement portion and said driving means and a second spring interposed between said first spring and said driving means.

12. A self-releasing, self-actuating braking system for a spinning mechanism comprising, a stationary member, a rotatable member, rotating means operatively connected to said rotatable member and operable for drivably rotating said rotatable member, said rotating means movable between drive and brake positons relative to said rotatable member, and braking means operatively connected to said rotating means and rotatable and movable with said rotating means and having a brake engagement portion for cooperating with said stationary member to stop said rotatable member in response to the movement of said rotating means to said brake position, said braking means including first means interposed between said brake engagement portion and said rotating means and supporting said brake engagement portion on the opposite side thereof from said stationary member and compressible when said rotating means is in said brake position for urging said rotating means away from said stationary portion to said drive position in a manner to release the cooperation between said brake engagement portion and said stationary member to release said rotatable member before said rotating means operates in said drive position to drivably rotate said rotatable member and second means interposed between said first means and said rotating means in a manner for continuously urging said brake engagement portion toward said stationary portion and responsive to the drive release of said rotating means to insure prompt movement of said rotating means to said brake position and actuation of said braking means to stop said rotatable member after said rotating means operates to rotate said rotatable member.

13. The braking system of claim 12 wherein said first means is a Belleville-type spring and said second means is a coil spring.

(References on following page)

References Cited by the Examiner

UNITED STATES PATENTS

| | | | |
|---|---|---|---|
| 2,464,589 | 3/49 | Landahl | 192—8 |
| 2,659,466 | 11/53 | Ochtman | 192—8 |
| 2,727,604 | 12/55 | Robertson | 192—8 |
| 2,834,443 | 5/58 | Olchawa | 192—8 |
| 2,925,157 | 2/60 | Davis | 192—8 |
| 3,068,975 | 12/62 | Theuer | 192—8 |

FOREIGN PATENTS

| | | |
|---|---|---|
| 581,584 | 10/46 | Great Britain. |

DAVID J. WILLIAMOWSKY, *Primary Examiner.*

BROUGHTON G. DURHAM, *Examiner.*